No. 754,668. Patented March 15, 1904.

UNITED STATES PATENT OFFICE.

WALTER MILLS, OF LONDON, ENGLAND, ASSIGNOR TO A. O. GRANGER, OF CARTERSVILLE, GEORGIA.

PROCESS OF MAKING AMMONIUM NITRATE.

SPECIFICATION forming part of Letters Patent No. 754,668, dated March 15, 1904.

Application filed May 25, 1903. Serial No. 158,625. (No specimens.)

*To all whom it may concern:*

Be it known that I, WALTER MILLS, a subject of the King of Great Britain, residing in London, England, have invented certain new and useful Improvements in Processes of Making Ammonium Nitrate, of which the following is a specification.

This invention has for its object the preparation on a commercial scale of pure nitrate of ammonia through the intermediary of nitrate of lead. The preparation of nitrate of lead is economically effected by the action of the nitrates—such as nitrate of calcium, potassium, or sodium—on silicofluorid of lead, which latter is readily made by the action of hydrofluosilicic acid upon metallic lead or its ores, especially galena or cerusite.

In carrying the present improvements into practice nitrate of lead is manufactured in the following manner: Scrap-lead or ores of lead, preferably in a crushed and finely-ground condition, are permitted to react in a pan or other receptacle with the acid, and the reaction is assisted by the aid of heat, which is usually continued until the mass has reached a substantially dry condition. If galena or scrap-lead is used, it is immaterial whether the same be added to the acid or the acid be added to it. If ores such as cerusite or other oxygen-carrying compounds be used, it is necessary to add the same to the acid—that is, to have the acid in excess—as otherwise silicates are formed. The acid begins to attack the material when of a specific gravity of about 1.80. When scrap-lead is used, the action of the acid is accelerated somewhat by blowing air through the mass. Warm water is then added to form an aqueous solution of lead silicofluorid. After being filtered the solution is ready for the addition of a nitrate, such as nitrate of calcium, potassium, or sodium, either in aqueous solution or in fine powder. The silicofluorids of the respective metal are precipitated, while nitrate of lead remains in solution. For the preparation of ammonium nitrate from this solution of nitrate of lead I generally employ a solution of ammonia or one of its salts, such as fluorid of ammonium. It is best to heat the two solutions to a temperature of about 80° centigrade before mixing; otherwise double salts in a more or less hydrated condition are frequently formed and precipitated. Such double salts may, however, be resolved by washing them with water at about 100° centigrade.

Having described my invention, I claim—

1. The process of making ammonium nitrate which consists in first forming silicofluorid of lead; then converting the same into the nitrate; and finally reacting upon the nitrate of lead with fluorid of ammonium.

2. The process of making ammonium nitrate which consists in heating a mixture of lead or lead-carrying compound and hydrofluosilicic acid of about 1.80 specific gravity; in adding a nitrate to a solution of the lead silicofluorid so formed; and in finally decomposing the lead nitrate with ammonium fluorid.

Signed at Nos. 9 to 15 Murray street, New York, N. Y., this 23d day of May, 1903.

WALTER MILLS.

Witnesses:
FRED. J. DOLE,
JOHN O. SEIFERT.